(12) United States Patent
Parnapy et al.

(10) Patent No.: US 9,698,582 B2
(45) Date of Patent: Jul. 4, 2017

(54) QUICK CONNECTION IDENTIFICATION MODULE JUNCTION BOX

(71) Applicant: NEW YORK AIR BRAKE, LLC, Watertown, NY (US)

(72) Inventors: Keith Parnapy, North Bangor, NY (US); David Socha, Watertown, NY (US); Gary Newton, Adams, NY (US); Anthony Lumbis, Watertown, NY (US); Brian Gallagher, Watertown, NY (US); Bryan McLaughlin, Watertown, NY (US); Steven Newton, Adams, NY (US)

(73) Assignee: New York Air Brakes, LLC, Watertown, NY (US)

( * ) Notice: Subject to any disclaimer, the term of this patent is extended or adjusted under 35 U.S.C. 154(b) by 0 days.

(21) Appl. No.: 14/474,001

(22) Filed: Aug. 29, 2014

(65) Prior Publication Data

US 2016/0064880 A1    Mar. 3, 2016

(51) Int. Cl.
H02G 3/08 (2006.01)

(52) U.S. Cl.
CPC ............. *H02G 3/081* (2013.01); *H02G 3/083* (2013.01); *H02G 3/088* (2013.01)

(58) Field of Classification Search
CPC .............................. H01R 13/5202; H02B 7/06
USPC ................................................ 439/559; 174/1
See application file for complete search history.

(56) References Cited

U.S. PATENT DOCUMENTS

| | | | |
|---|---|---|---|
| 6,012,681 A | 1/2000 | Lumbis et al. | |
| 6,283,765 B1* | 9/2001 | Lumbis | B60T 13/665 439/35 |
| 7,748,986 B1 | 7/2010 | Parnapy et al. | |
| 2003/0207614 A1* | 11/2003 | Newton | B60T 13/665 439/559 |
| 2012/0129373 A1* | 5/2012 | Cossette | H01R 13/6581 439/248 |
| 2015/0148791 A1* | 5/2015 | Birdsall | A61B 18/02 606/21 |

OTHER PUBLICATIONS

International Search Report Form PCT/ISA/220, International Application No. PCT/US2014/053593, pp. 1-10, Dated May 4, 2015.

* cited by examiner

*Primary Examiner* — Hoa C Nguyen
*Assistant Examiner* — Stanley Tso
(74) *Attorney, Agent, or Firm* — Bond Schoeneck and King PLLC; David Nocilly (57) ABSTRACT

An electrical trainline junction box formed from a housing having first and second opposing sides, an identification module positioned in the housing, and first and second receptacles positioned in each of the first and second opposing sides. The first and second receptacles have a plurality of electrical contacts arranged in a predetermined geometry so that only one possible orientation and electrical connection to trainline flanges is possible. The flanges include contact pins in inserts coupled to the flanges by sleeves. The outer surface of the inserts and the inner surface of the sleeves are keyed to allow only a single orientation of the inserts relative to the sleeves. The outer surface of the sleeves is shaped to allow only a single orientation of the sleeves relative to the flanges, thus ensuring that the proper electrical connection is made when the junction box is installed.

9 Claims, 13 Drawing Sheets

QUICK CONNECTION IDENTIFICATION MODULE JUNCTION BOX

BACKGROUND OF THE INVENTION

1. Field of the Invention

The present invention relates to electrical trainline junction boxes and, more specifically, to junction box that is more easily wired into a trainline.

2. Description of the Related Art

A train line junction box assembly is generally provided at each end of the rail car or locomotive. An electrical cable line within the car is typically connected at a terminal block within the junction box. An electrical connector receptacle is also provided in the junction box and connected to the terminal block. The cable is then received in the connector/receptacle to interconnect between a pair of cars. Electronically controlled pneumatic (ECP) train brakes generally use a junction box for trainline power termination and another, more specialized junction box that houses the electronic identification modules that provides vehicle specific information to the car control device or trainline communication center, such as vehicle number, type of vehicle, weight, and other vehicle parameters.

A electronic identification junction box typically includes a housing and a terminal block which is mounted in the interior of the housing. Fastener apertures that are provided adjacent to the corners of the walls of the housing allow for fasteners that mount the body of the housing to the car. A strain relief sleeve member is threadably received on a threaded sleeve and includes a split collar that is tightened by a screw. A cable containing the trainline wires is received through the strain relief member and the internal wires are connected to the terminal block. Unfortunately, the walls of the housing are relatively thin and the threading can only engage the housing with one or two turns. As a result, the interconnection is weak and vulnerable to damage and seepage, which prevents the moisture tightness of the enclosure for the junction box.

More recent junction boxes for use in ECP trains, such as that is described in U.S. Pat. No. 6,669,506, remain susceptible to damage. Trainline junction boxes, which must be wired in the field by highly trained personnel, are susceptible to installation or wiring mistakes that expose the sensitive internal components to detrimental environmental conditions. Thus, there is a need for an identification module junction box that is more robust and that preferably reduces the possibility for installation and wiring mistakes. For example, existing junction boxes require that the installer open the cover of the junction box and make the right connections between the ring terminals on the trainline cables and the threaded posts on the IDM.

This presents several risks and difficulties, including making the right connections, properly installing the ring terminal and associated flat washer, lock washer, and nut on the terminal post, properly torquing the small ring terminal nuts, properly replacing the junction box cover and cover gasket, and properly torquing the cover bolts. Failure to properly do this assembly onto the rail car could result in system failure due to water ingress, a wire loosening from the terminal stud, or miswiring. In addition, there is a potential safety risk to the installer/maintainer if the system power was not shut off prior to removing the junction box cover.

BRIEF SUMMARY OF THE INVENTION

The present invention comprises an electrical trainline junction box comprising a housing having first and second opposing sides, an identification module positioned in the housing, first and second receptacles positioned in each of the first and second opposing sides, respectively, wherein each of the first and second receptacles have a plurality of electrical contacts arranged in a predetermined geometry. First and second flanges are coupled to the first and second receptacles, respectively. Each of the first and second flanges includes a plurality of contact pins arranged to correspond exactly to the predetermined geometry of the plurality of electrical contacts of each of the first and second receptacles. The plurality of contact pins in each of the first and second flanges are positioned in first and second inserts and coupled to the first and second flanges by first and second sleeves. The outer surface of the first and second inserts and the inner surface of the corresponding first and second sleeves are keyed to allow only a single orientation of the first and second inserts relative to the first and second sleeves. The outer surface of the first and second sleeves is shaped to allow only a single orientation of the first and second sleeves relative to the first and second flanges, respectively.

Each of the first and second receptacles comprise a mount having a central opening, a pair of mounting holes positioned on either side of the central opening, and a sealing ring positioned around the plurality of electrical connections. The housing comprises first and second covers secured to the opposing sides of the housing. The first and second receptacles are positioned in the first and second covers, respectively. The identification module includes first and second sets of electrical pins interconnected to the first and second electrical contacts of the first and second receptacles, respectively. The identification module is attached to the first side of the housing by a set of asymmetrical connectors that only allow the identification module to be attached in a single orientation relative to the first side of the housing.

In another embodiment, each of the first and second receptacles comprise a threaded port surrounding the plurality of electrical connections. First and second bodies, each of which include a threaded nut surrounding a plurality of male contact pins that are arranged in a corresponding geometry to the plurality of electrical connections so that only one mating orientation of the male contact pins relative to the plurality of electrical connections is possible

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
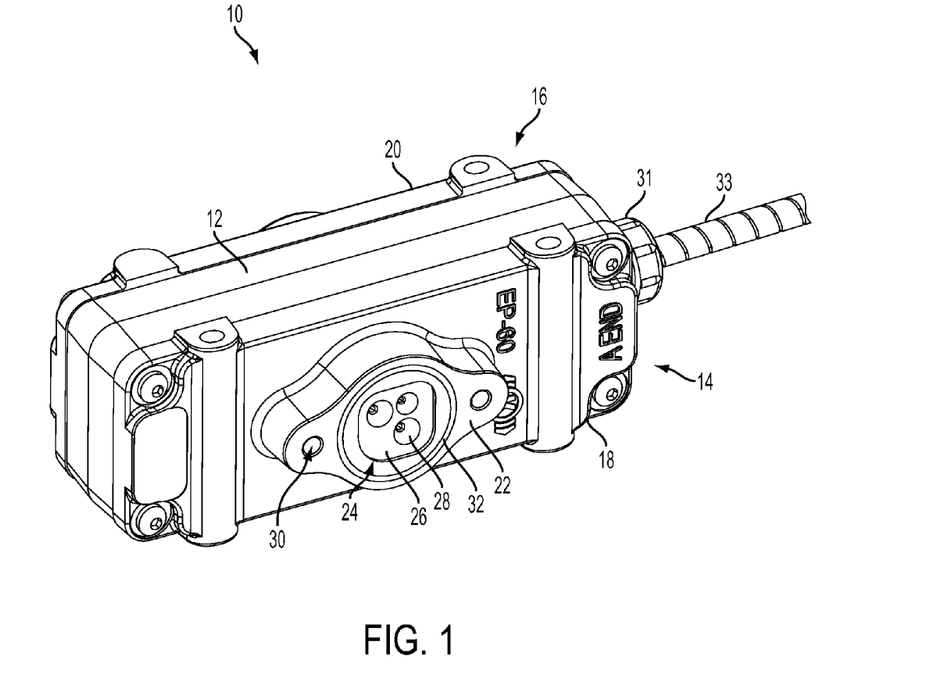
FIG. 1 is a perspective view of a junction box according to the present invention.

Referring now to the drawings, wherein like reference numerals refer to like parts throughout, there is seen in FIG. 1 an identification module junction box 10 that is fully assembled prior to installation in the field and provides for quick connection of the trainlines. As a result, junction box 10 may be tested at the factory and installed in the field without opening any cover. Connections to the trainlines are made by quick connections, such as pin and socket connectors, which allow for connection to the outside of junction box 10 without the need to open junction box 10, thereby eliminating the need for small fasteners and avoiding the possibility of miswired connections.

Junction box 10 generally comprises a generally rectangular cuboid housing 12 having an A side 14 on one major surface and a B side 16 on the opposing major surface. When installed on the rail car, A side 14 of junction box 10 is aligned with the "A" end of the rail car, and B side 16 of junction box 10 is aligned with the "B" end of the rail car in accordance with Association of American Railroads (AAR) standard definitions. As described below, junction box includes an internal identification module 36 having a current sensor and a series switchable load for sequencing. The current sensor is located on the B end of the circuit and the load on the A end. As a result, during a single car test if the car is powered from the B end and commanded to switch in the load, the current sensor will detect the current flowing to the load resistor. If the single car test is run from the A end, when the load is switched in the current bypasses the current sensor. In this way, car orientation can be determined with junction box 10 providing poke yoke orientation to the car ends A and B.

Figure 2:
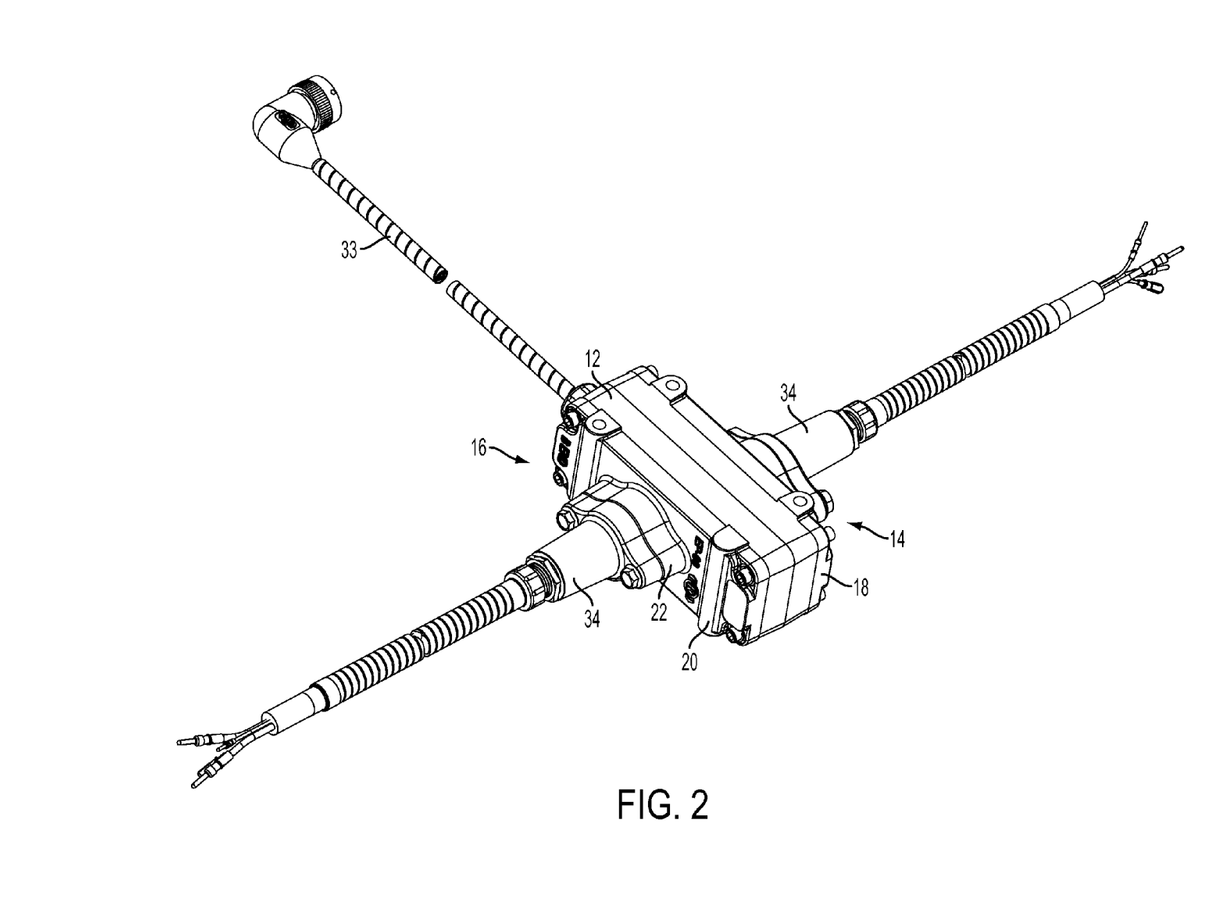
FIG. 2 is a perspective view of a junction box and flanges according to the present invention.

Each of A side 14 and B side 16 having a corresponding A end cover 18 and B end cover 20 mounted to housing 12. Each of A end cover 18 and B end cover 20 define a central mount 22 having an opening 24 that supports a receptacle 26 positioned in a through bore 24 having a plurality of electrical connections 28. Two flange receiving holes 30 are positioned on either side of receptacle 26 and an O-ring 32 in mount 22 surrounds through bore 24 and receptacle 26. Housing 12 further includes a port 31 for interconnecting box 10 to a drop cable 33. A end cover 18 and B end cover 20 may be machined from the same casting due to their symmetrical design, and the reversal of positioning relative to housing 12 provides an offset needed for proper pin alignment of the trainline and shield pins. As seen in FIG. 2, a trainline flange 34 may be secured to each receptacle 26 so that flange 34 is in sealing engagement with O-ring 32.

Figure 3:
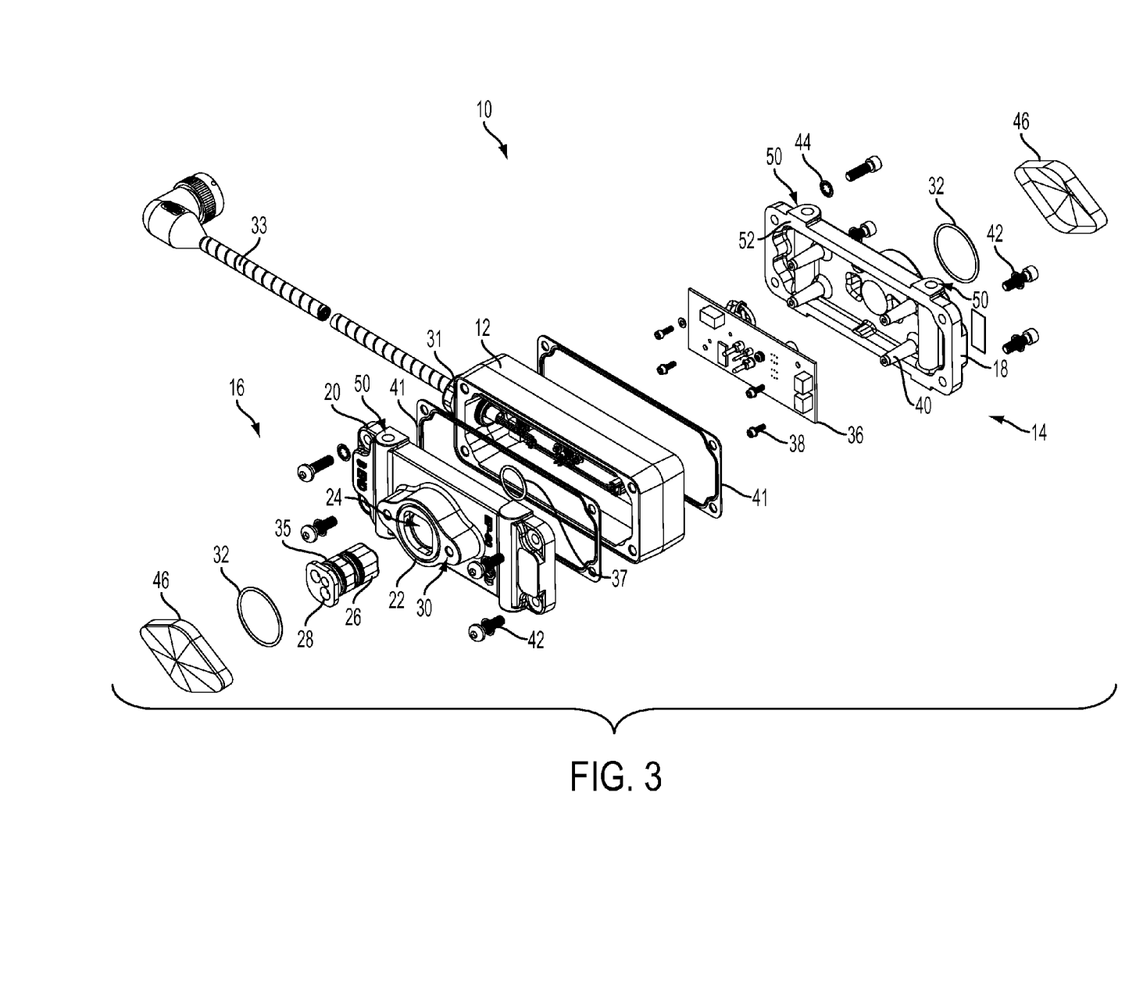
FIG. 3 is an exploded view of a junction box according to the present invention.

Referring to FIG. 3, receptacle 26 includes an O-ring positioned circumferentially around an intermediate portion thereof for sealing receptacle 26 within opening 24 of mount 22 and thereby sealing the inside of housing 12 against the external contaminants. A second O-ring 37 is used retrain receptacle 26 in A end side cover 18 and in B end cover 16. An IDM board assembly 36 is mounted within housing 12, preferably by attaching board assembly 36 to A end cover 18 via a series of screws 38 that engage corresponding bosses 40 positioned on A end cover 18. A gasket 41 is positioned between housing 12 and each of A end cover 18 and B end cover 20. A end cover 18 and B end cover 20 are secured to housing 12 by threaded screws 42, such as socket head cap screws, and resilient washers 44. A pilot lip 52 formed along the inside of each of A end cover 18 and B end cover 20 may ensure that A end cover 18 and B end cover 20 are properly aligned and gasket 41 is in place prior to assembly. Lip 52 also provides a defined squeeze on gasket 41 and allows full torquing of the fasteners due to a metal to metal interface. Housing 12 may further include a cap 46 for covering each mount 22 until box 10 is installed, caps 46 are removed, and flanges 34 are mounted to mounts 22. As further seen in FIG. 3, A end cover 18 has two bolt holes 50 formed along a lateral edge and B end cover 20 has one bolt hole 50 formed along a lateral edge to key junction box 10. The three-bolt configuration provided by bolt holes 50 poke-yokes the installation and assures that junction box 10 is oriented with the A and B faces in alignment with the A and B ends of the car, especially during maintenance needed to replace a defective junction box 10 on a rail car.

Figure 4:
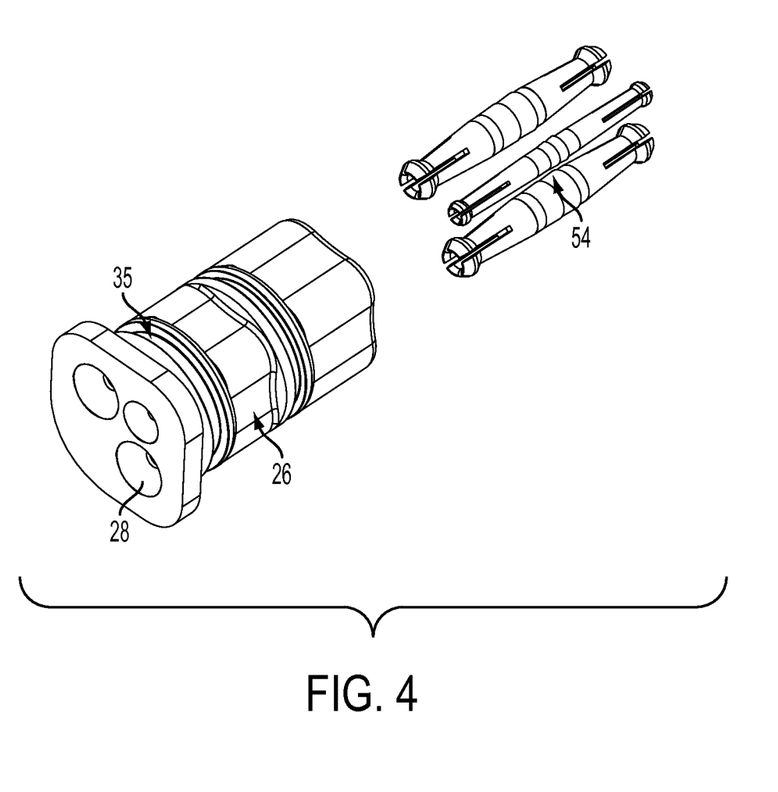
FIG. 4 is an exploded view of a plug for a junction box according to the present invention.

As seen in FIG. 4, each receptacle 26 supports a plurality of female contact pins 54 that form the plurality of electrical connections 28. Preferably, female contact pins 54 are electrically conductive and receptacle 26 is formed from a dielectric material to electrically isolate plurality of each contact female contact pin 54 from each other female contact pin 54. Receptacle 26 is configured to properly arrange pins 54 into a predetermine configuration that corresponds to the proper wiring of box 10 to the trainline.

Figure 5:
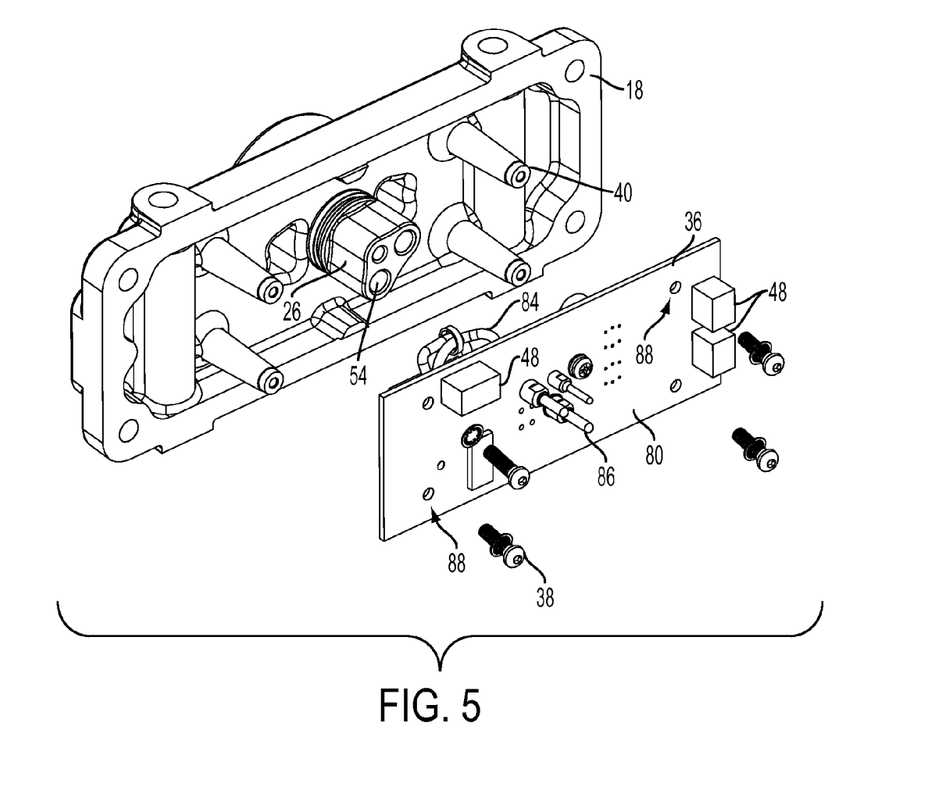
FIG. 5 is an exploded view of an A end cover and board assembly according to the present invention.
Figure 5A:
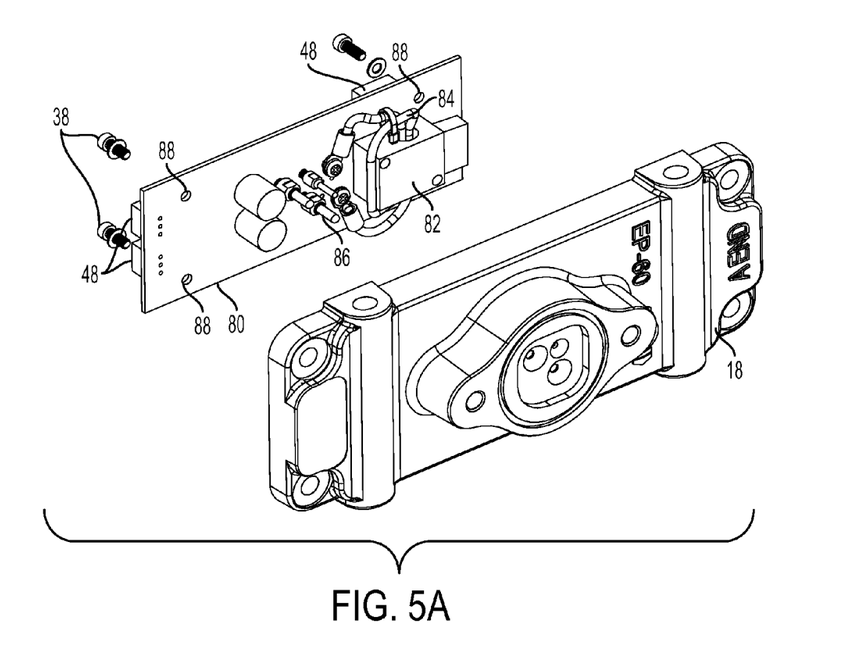
FIG. 5A is an exploded view of an A end cover and board assembly according to the present invention.
Figure 6:
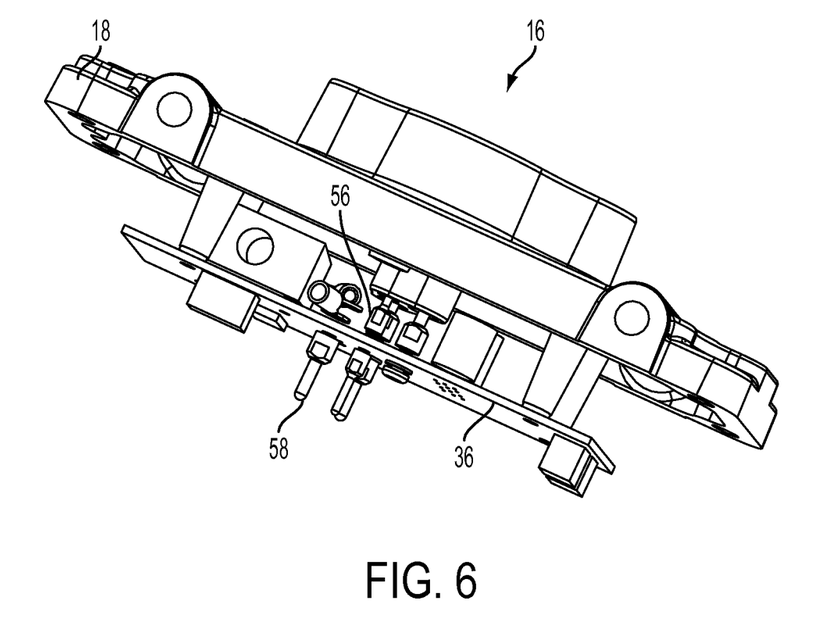
FIG. 6 is a perspective view of an A side cover and board assembly according to the present invention.

As seen in FIG. 5, female contact pins 54 are installed in receptacle 26 so that they extend through A end cover 18 interiorly of housing 12 and are available to provide an electrical connection to board assembly 36. Board assembly 36 comprises a printed circuit board 80 having a current sensor 82, trainline through current sensors 84, a trainline straight through and shield straight through 86, and a plurality of asymmetrically offset mounting holes 88. As seen in FIG. 6, female contact pins 54 of receptacle 26 of A end cover 18 accept a first set of male contact pins 56 on board assembly 36. Board assembly 36 further includes a second set of male contact pins 58 on an opposing side surface for connecting to the female contact pins 54 of receptacle 26 that is positioned in B side 16. Preferably, bosses 40 are asymmetrically arranged with corresponding mounting holes 88 so that board assembly 36 may only be secured to A end cover 18 in the proper orientation and with the proper electrical connections being made. Board assembly 36 further includes connectors 48 for electrical connection to a drop cable 33.

Figure 7:
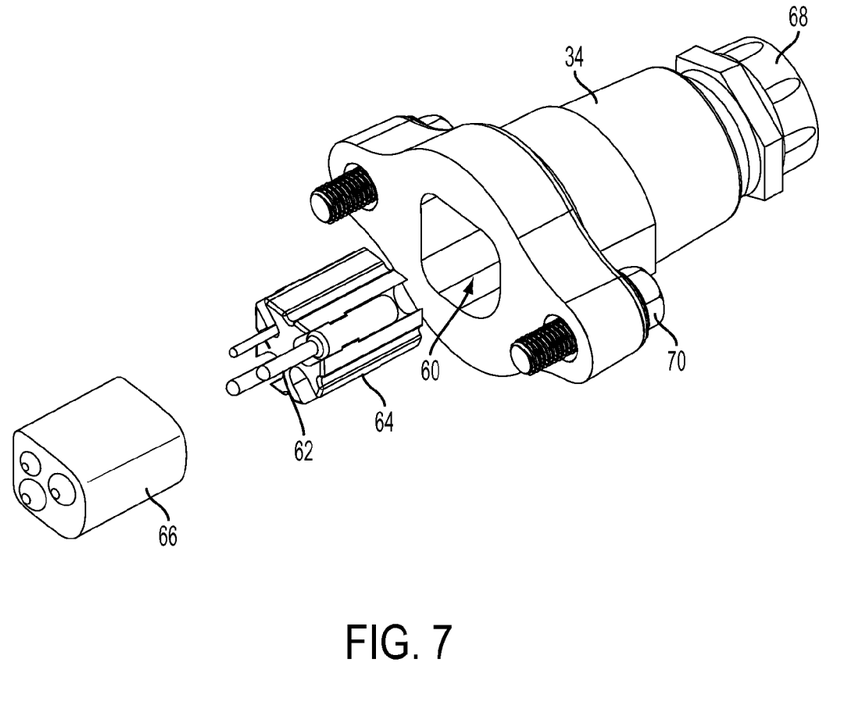
FIG. 7 is a perspective view of a trainline flange according to the present invention.

Referring to FIG. 7, each trainline flange 34 includes a bore 60 formed therethough for supporting a plurality of male contact pins 62 configured to engage the corresponding plurality of female contact pins 54 of receptacle 26. Male contact pins 62 are preferably supported by an insert 64 that electrically isolates male pins 62 from each other and is captured within bore 60 by a sleeve 66 that permits the ends of male pins 62 to extend therefrom. The internal surfaces of sleeve 66 may be keyed to ensure that insert 64 can only be inserted therein in the proper orientation, and the outer shape of sleeve 66 configured to ensure that sleeve 66 can only be inserted into bore 60 in the proper orientation.

As seen in FIGS. 4 and 7, the specific geometric arrangement of female contact pins 54 of receptacle 26 and male pins 62 of flange 34 can be preconfigured to ensure that flange 34 can only be mounted to box 10 in the proper orientation. As box 10 and flange 34 are manufactured and assembled prior to installation in a rail car, the predetermined arrangement of female contact pins 54 of receptacle 26 and male contact pins 62 of flange 34 ensures that box 10 is always properly wired to the trainline when installed. Flange 34 further comprises a strain relief member 68 and a pair of screws 70 for securely coupling flange 34 to receiving holes 30 of mount 22.

Figure 8:
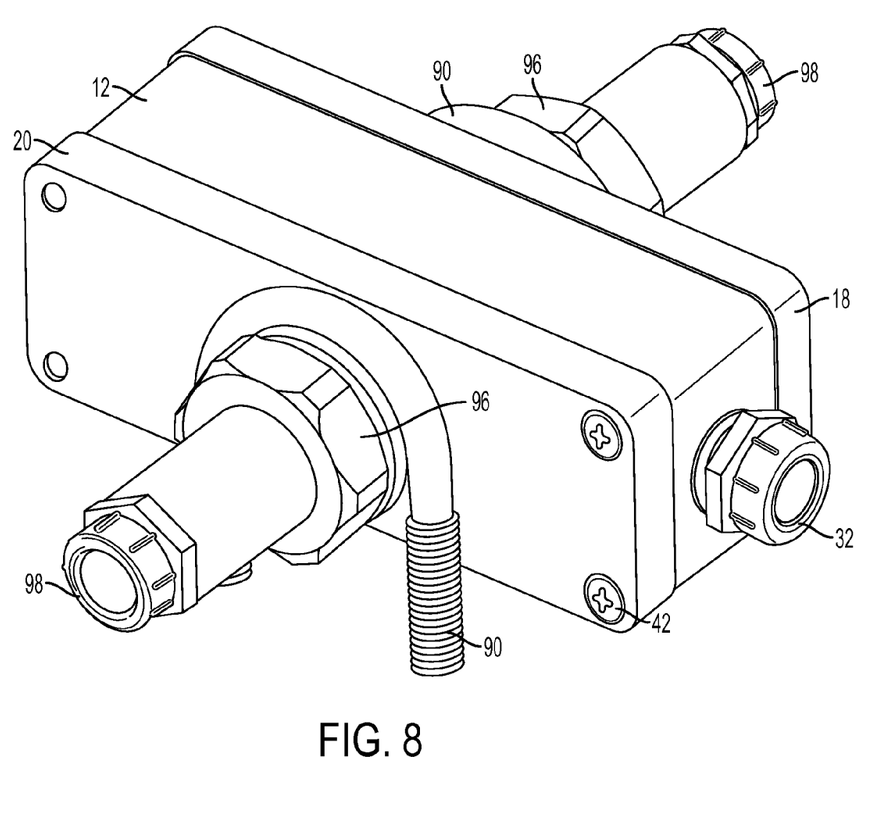
FIG. 8 is a perspective view of an alternative mounting arrangement according to the present invention.
Figure 9:
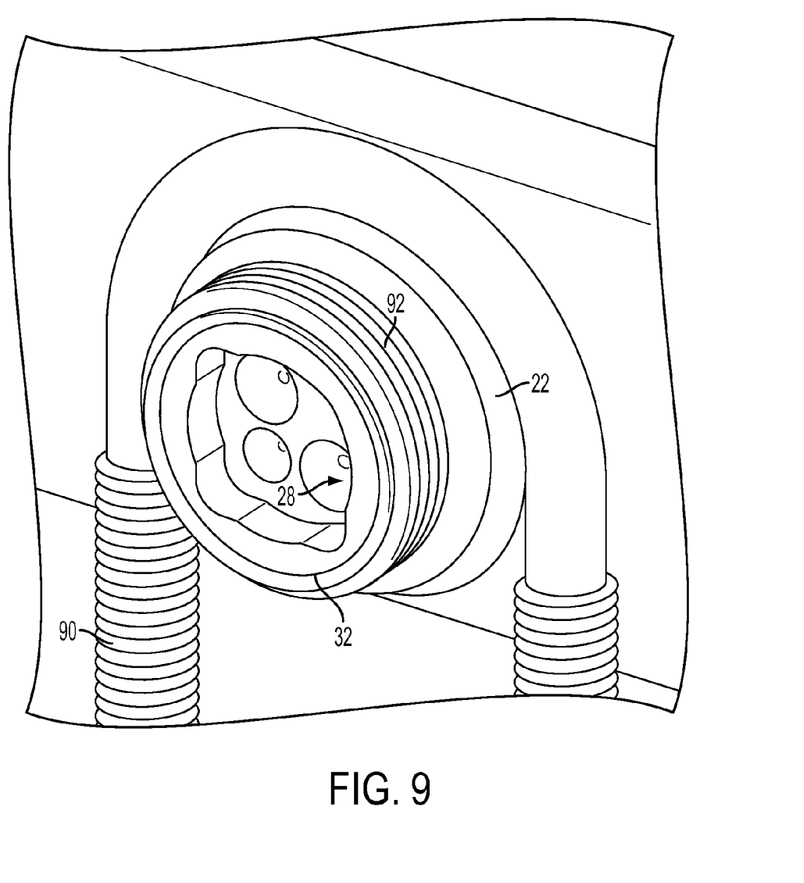
FIG. 9 is a perspective view of an alternative mount according to the present invention.
Figure 10:
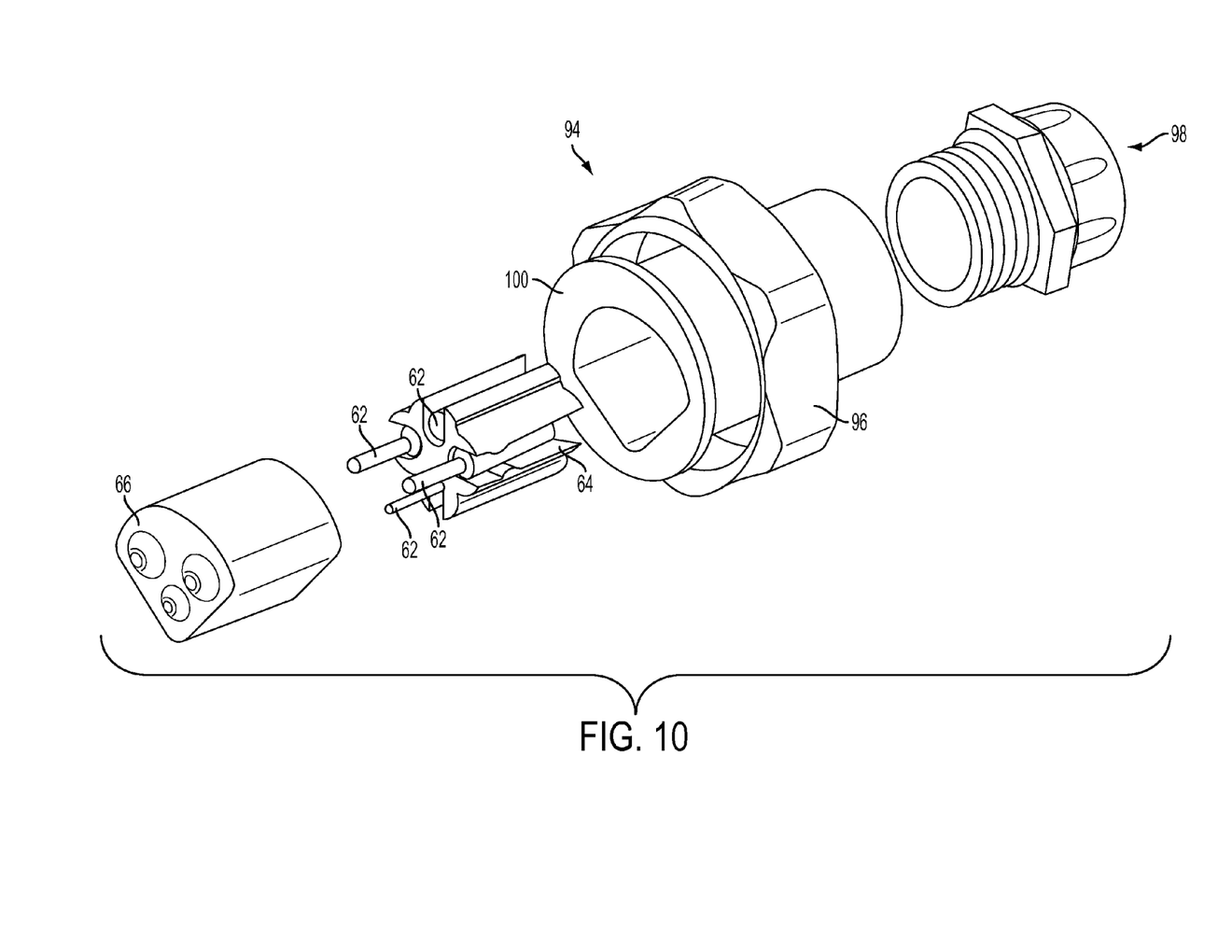
FIG. 10 an exploded view of an alternative trainline flange according to the present invention.

Referring to FIG. 8, box 10 may alternatively be mounted to a rail car using standard AAR U-bolts 90. In this embodiment, as seen in FIG. 9, mount 22 includes a threaded port 92 surrounding the plurality of electrical connection 28. As with the embodiment described above, O-ring 32 may be used to sealing engage the trainline flanges 94. As seen in FIG. 10, the trainline flanges 94 supporting male contact pins 62 in an insert 64 that is captured a sleeve 66. Flange 94 includes a threaded nut 96 for engaging the threaded port 92 of mount 22 and is coupled to a strain relief member 98 and positioned with a body 100 supporting inside nut 96

Figure 11:
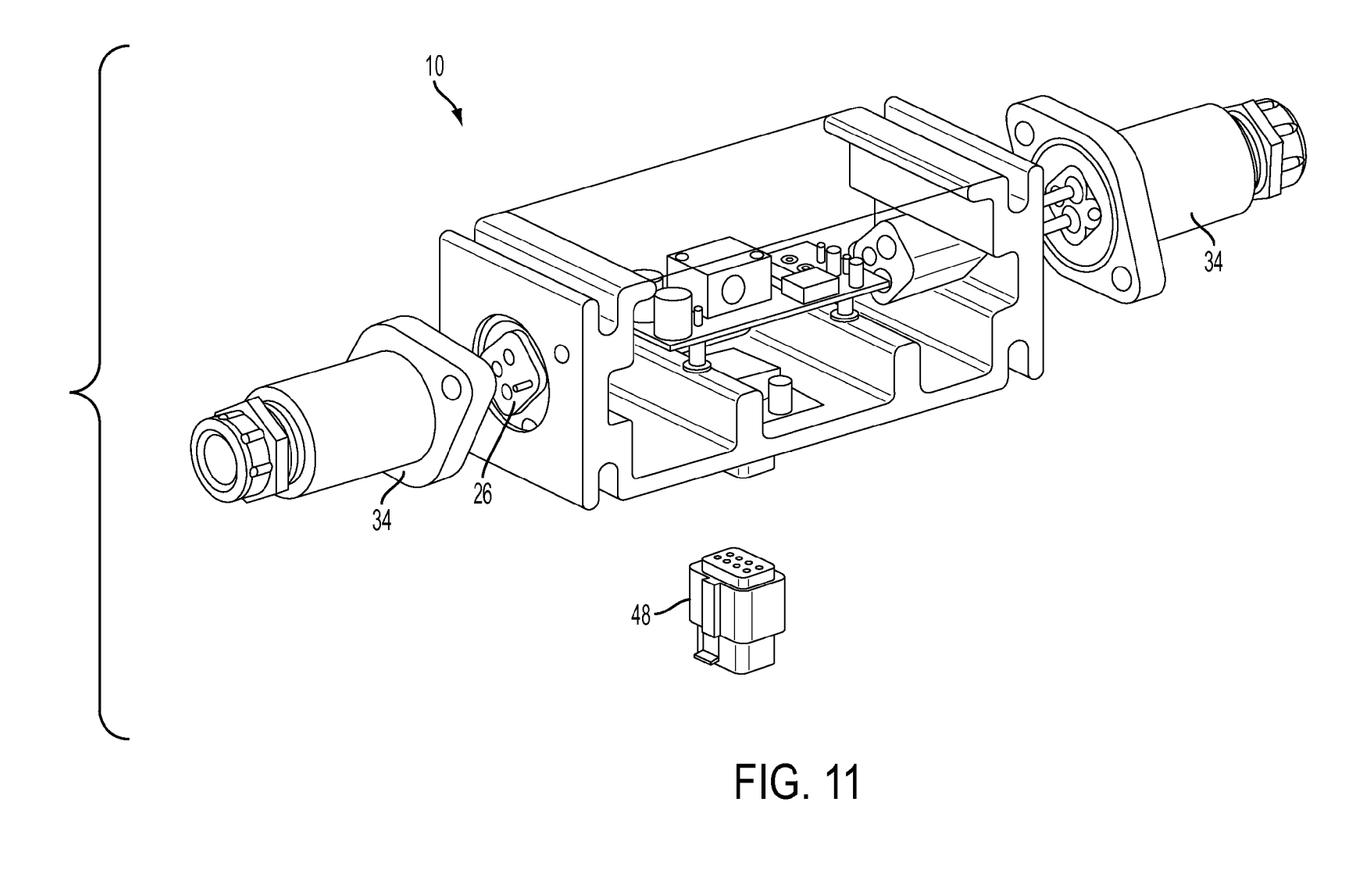
FIG. 11 is an exploded view of an alternatively manufactured junction box according to the present invention.
Figure 12:
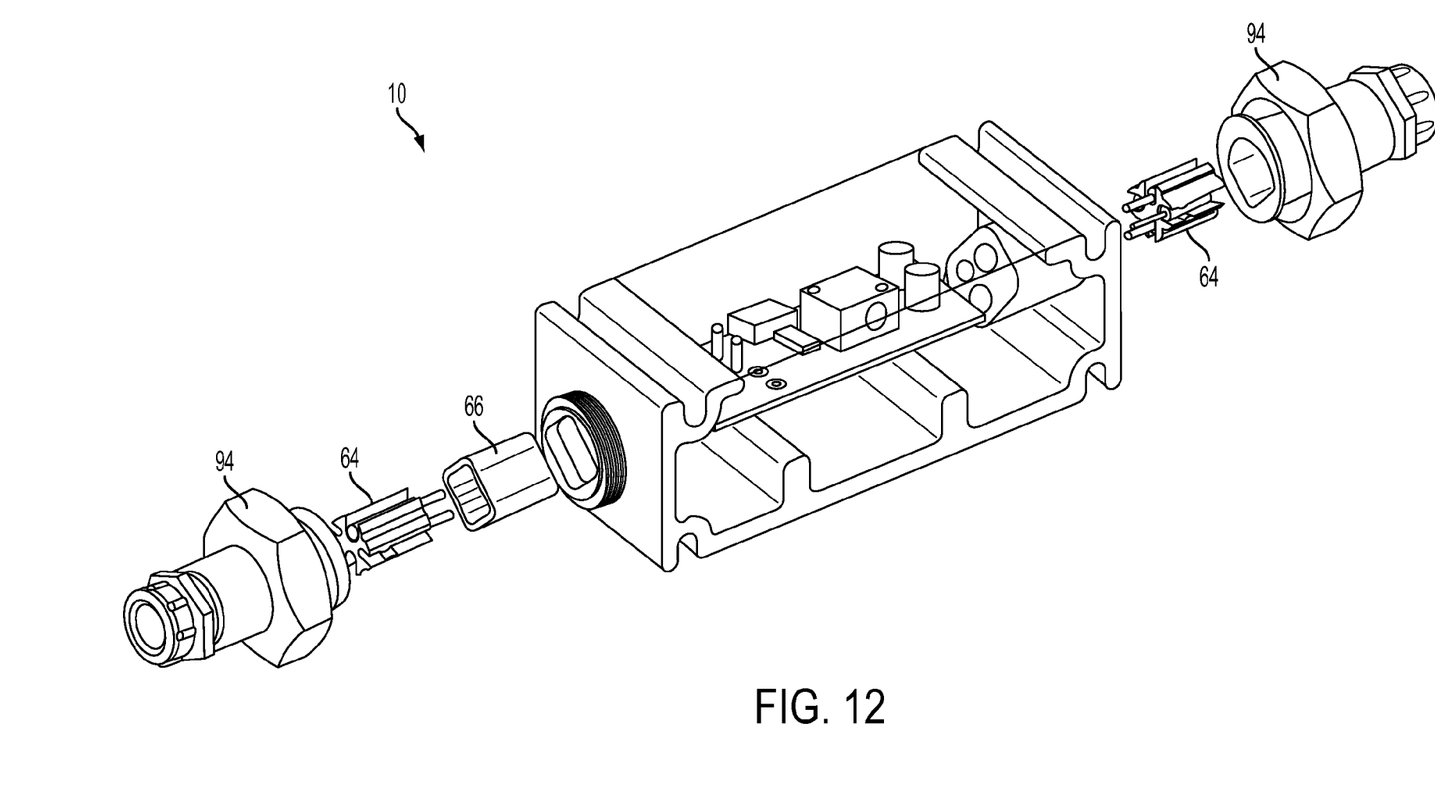
FIG. 12 is an exploded view of an alternatively manufactured junction box according to the present invention.

Referring to FIGS. 11 and 12, box 10 may be configured so that the trainline connections, i.e., the A side and B side 16, are on the opposing minor surfaces of housing 10. This configuration may be used if housing 10 is extruded and then fully potted once assembled so that housing 10 has three extruded sides and three potted sides. In this embodiment, drop cable mount 48 may be provided in housing 10 rather than on board assembly 36.

What is claimed is:

1. An electrical trainline junction box, comprising:
a housing having first and second opposing sides;
first and second openings formed in the first and second opposing sides, respectively;
an identification module positioned in the housing and having a printed circuit board with a first side with a first plurality of male contact pins and an opposing second side with a second plurality of male contact pins,
wherein the first plurality of male contact pins extend outwardly in a first direction and the second plurality of male contact pins extend outwardly in a second direction that is opposite to the first direction;
first and second receptacles positioned in each of the first and second openings formed in the first and second opposing sides, respectively;
a first plurality of electrical contacts supported in the first receptacle and arranged in a first predetermined geometry,
wherein each of the first plurality of electrical contacts extends through the first receptacle to be define a first plurality of female contact pins exposed interiorly and exteriorly of the housing;
a second plurality of electrical contacts supported in the second receptacle and arranged in a second predetermined geometry,
wherein each of the second plurality of electrical contacts extends through the first receptacle to be define a second plurality of female contact pins exposed interiorly and exteriorly of the housing;
wherein the first plurality of male contact pins of the identification module are received within and engaged with the first plurality of female contact pins of the first plurality of electrical contacts of the first receptacle and the second plurality of male contact pins of the identification module are received within and engaged with the second set of female contact pins of the second plurality of electrical contacts of the second receptacle,
further comprising first and second flanges external of the housing and coupled to first and second mounts associated with the housing and supporting the first and second receptacles, respectively,
wherein each of the first and second flanges includes a third and a fourth plurality of male contact pins, respectively, that are arranged to correspond exactly to the predetermined geometry of the first plurality and second plurality of female contact pins of the plurality of electrical contacts of each of the first and second receptacles, and
wherein the identification module is attached to the first side of the housing by a set of asymmetrical connectors that only allow the identification module to be attached in a single orientation relative to the first side of the housing.

2. The junction box of claim 1, wherein the first and second plurality of male contact pins in each of the first and second flanges are positioned in first and second inserts and coupled to the first and second flanges by first and second sleeves.

3. The junction box of claim 2, wherein the outer surface of the first and second inserts and the inner surface of the corresponding first and second sleeves are keyed to allow only a single orientation of the first and second inserts relative to the first and second sleeves.

4. The junction box of claim 3, wherein the outer surface of the first and second sleeves is shaped to allow only a single orientation of the first and second sleeves relative to the first and second flanges, respectively.

5. The junction box of claim 1, wherein each of the first and second receptacles comprise a mount having a central opening, a pair of mounting holes positioned on either side of the central opening, and a sealing ring positioned around the plurality of electrical connections.

6. The junction box of claim 5, wherein the housing comprises first and second covers secured to the opposing sides of the housing.

7. The junction box of claim 6, wherein the first and second receptacles are positioned in the first and second covers, respectively.

8. The junction box of claim 1, wherein each of the first and second receptacles comprise a threaded port surrounding the plurality of electrical connections.

9. The junction box of claim 8, further comprising a first and second bodies, each of which include a threaded nut surrounding a plurality of male contact pins that are arranged in a corresponding geometry to the plurality of electrical connections so that only one mating orientation of the male contact pins relative to the plurality of electrical connections is possible.

* * * * *

UNITED STATES PATENT AND TRADEMARK OFFICE
CERTIFICATE OF CORRECTION

PATENT NO. : 9,698,582 B2
APPLICATION NO. : 14/474001
DATED : July 4, 2017
INVENTOR(S) : Keith Parnapy et al.

Page 1 of 1

It is certified that error appears in the above-identified patent and that said Letters Patent is hereby corrected as shown below:

Column 6, Line 53, beginning with "The Junction box of claim 8" remove the letter "a" after the word "compromising" and before the word "first".

Signed and Sealed this
Fifteenth Day of May, 2018

Andrei Iancu
*Director of the United States Patent and Trademark Office*